US012596674B2

(12) United States Patent
Bhoyar et al.

(10) Patent No.: US 12,596,674 B2
(45) Date of Patent: Apr. 7, 2026

(54) SYSTEM FOR DATA ARCHIVAL IN A BLOCKCHAIN NETWORK AND A METHOD THEREOF

(71) Applicant: NATIONAL PAYMENTS CORPORATION OF INDIA, Mumbai (IN)

(72) Inventors: Sarang Vinayak Bhoyar, Nagpur (IN); Tittu Varghese, Alappuzha (IN); Vishal Anand Kanvaty, Hyderabad (IN)

(73) Assignee: NATIONAL PAYMENTS CORPORATION OF INDIA, Mumbai (IN)

( * ) Notice: Subject to any disclaimer, the term of this patent is extended or adjusted under 35 U.S.C. 154(b) by 0 days.

(21) Appl. No.: 18/833,673

(22) PCT Filed: Dec. 14, 2022

(86) PCT No.: PCT/IB2022/062194
§ 371 (c)(1),
(2) Date: Jul. 26, 2024

(87) PCT Pub. No.: WO2023/111882
PCT Pub. Date: Jun. 22, 2023

(65) Prior Publication Data
US 2025/0004984 A1 Jan. 2, 2025

(30) Foreign Application Priority Data
Dec. 17, 2021 (IN) .............................. 202121059063

(51) Int. Cl.
*G06F 16/11* (2019.01)
*H04L 67/104* (2022.01)
*H04L 67/1097* (2022.01)

(52) U.S. Cl.
CPC .......... *G06F 16/113* (2019.01); *H04L 67/104* (2013.01); *H04L 67/1097* (2013.01)

(58) Field of Classification Search
CPC ...... G06F 16/113; G06F 21/64; H04L 67/104; H04L 67/1097; H04L 9/0891
See application file for complete search history.

(56) References Cited

U.S. PATENT DOCUMENTS

| | | | | |
|---|---|---|---|---|
| 10,630,463 B2 * | 4/2020 | Mankovskii | .......... | H04L 9/3239 |
| 10,764,062 B2 * | 9/2020 | Yang | ..................... | H04L 63/123 |
| | | (Continued) | | |

FOREIGN PATENT DOCUMENTS

| | | | | |
|---|---|---|---|---|
| CN | 110910143 A | * 3/2020 | ............. | G06Q 40/04 |
| CN | 112015697 B | 2/2021 | | |
| | | (Continued) | | |

*Primary Examiner* — Neveen Abel Jalil
*Assistant Examiner* — Hubert Cheung
(74) *Attorney, Agent, or Firm* — Sand, Sebolt & Wernow Co., LPA

(57) ABSTRACT

The present invention envisages a system (100) for data archival in a blockchain network (20). The blockchain network (20) comprises a plurality of participating nodes, each categorized either as an archiver node (A1-A3) or a non-archiver node (N1-N3). The archiver nodes (A1-A3) maintain a database (102) comprising transaction data corresponding to all block creation events and corresponding transaction IDs. Each of the non-archiver nodes (N1-N3) comprises a data management module (104) which maintains an archival ledger (106a) comprising transaction data corresponding to a partial list of block creation events and corresponding transaction IDs. The data management module (104) receives a request for querying a transaction from a requester-non-archiver node, checks the archival ledger (106a) to determine whether the queried block is discarded or not, and retrieves and returns the transaction data from (Continued)

200

| Storing, in a database associated with each of the archiver nodes, a list of block creation events, a transaction identifier (ID) and transaction data associated with each of the events, and a hash corresponding to the transaction data corresponding to each event | 202 |
|---|---|

| Maintaining, by an archiving module executed in each non-archiver node of the network, an archival ledger in a local data store of the non-archiver node, the archival ledger comprising a list of block creation events, a unique transaction identifier (ID), and a HASH of the transaction data associated with each of the events | 204 |
|---|---|

| Receiving, by a data retrieving module executed in each non-archiver node of the network, a request for querying a transaction from a block, from another non-archiver node | 206 |
|---|---|

| Checking, by the data retrieving module, the archival ledger to determine whether the queried block is discarded or not | 208 |
|---|---|

| Retrieving and returning, by the data retrieving module, the transaction data associated with the block from one of the archival ledger and the database based on the determination | 210 |
|---|---| one of the archival ledger (106*a*) and the database (102) based on the determination.

10 Claims, 6 Drawing Sheets

(56) References Cited

U.S. PATENT DOCUMENTS

| | | | | |
|---|---|---|---|---|
| 2019/0268138 | A1 * | 8/2019 | Mankovskii | G06Q 20/065 |
| 2020/0167773 | A1 * | 5/2020 | Cervenka | H04L 9/0643 |
| 2020/0204378 | A1 * | 6/2020 | Yang | H04L 63/123 |
| 2021/0166219 | A1 * | 6/2021 | Vasa | G06Q 20/065 |
| 2023/0245117 | A1 * | 8/2023 | Higgins | H04L 9/50 |
| | | | | 705/39 |

FOREIGN PATENT DOCUMENTS

| | | | | | |
|---|---|---|---|---|---|
| CN | 112291376 | B | | 4/2021 | |
| CN | 113382204 | A | * | 9/2021 | H04N 7/181 |
| CN | 113434599 | A | * | 9/2021 | G06F 16/27 |
| CN | 113965572 | A | * | 1/2022 | H04L 67/10 |
| CN | 114025345 | A | * | 2/2022 | H04L 67/1095 |
| CN | 113965572 | B | * | 5/2024 | H04L 67/10 |
| KR | 20210065315 | A | * | 6/2021 | |
| WO | WO-2020197514 | A1 | * | 10/2020 | G06Q 20/065 |

* cited by examiner

10

20

200

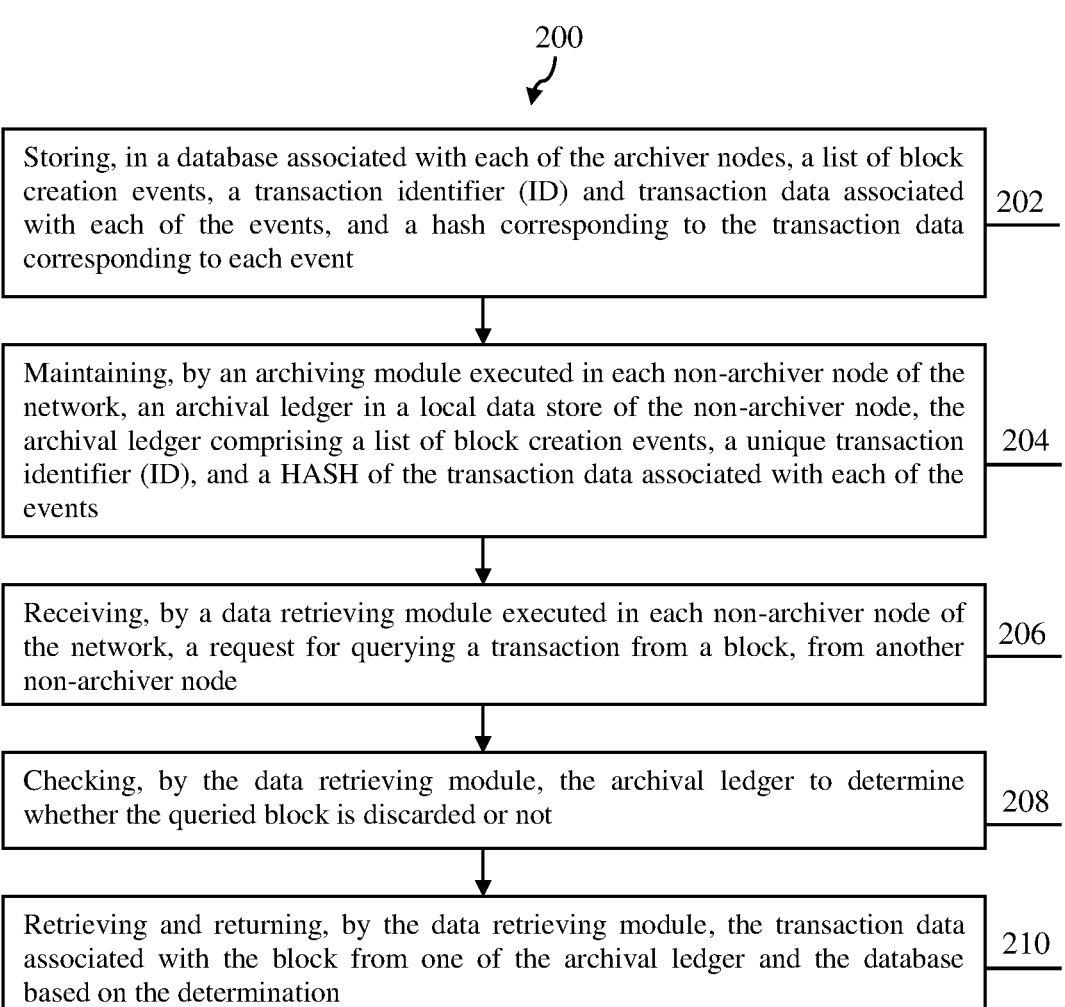

Storing, in a database associated with each of the archiver nodes, a list of block creation events, a transaction identifier (ID) and transaction data associated with each of the events, and a hash corresponding to the transaction data corresponding to each event — 202

Maintaining, by an archiving module executed in each non-archiver node of the network, an archival ledger in a local data store of the non-archiver node, the archival ledger comprising a list of block creation events, a unique transaction identifier (ID), and a HASH of the transaction data associated with each of the events — 204

Receiving, by a data retrieving module executed in each non-archiver node of the network, a request for querying a transaction from a block, from another non-archiver node — 206

Checking, by the data retrieving module, the archival ledger to determine whether the queried block is discarded or not — 208

Retrieving and returning, by the data retrieving module, the transaction data associated with the block from one of the archival ledger and the database based on the determination — 210

FIGURE 5A

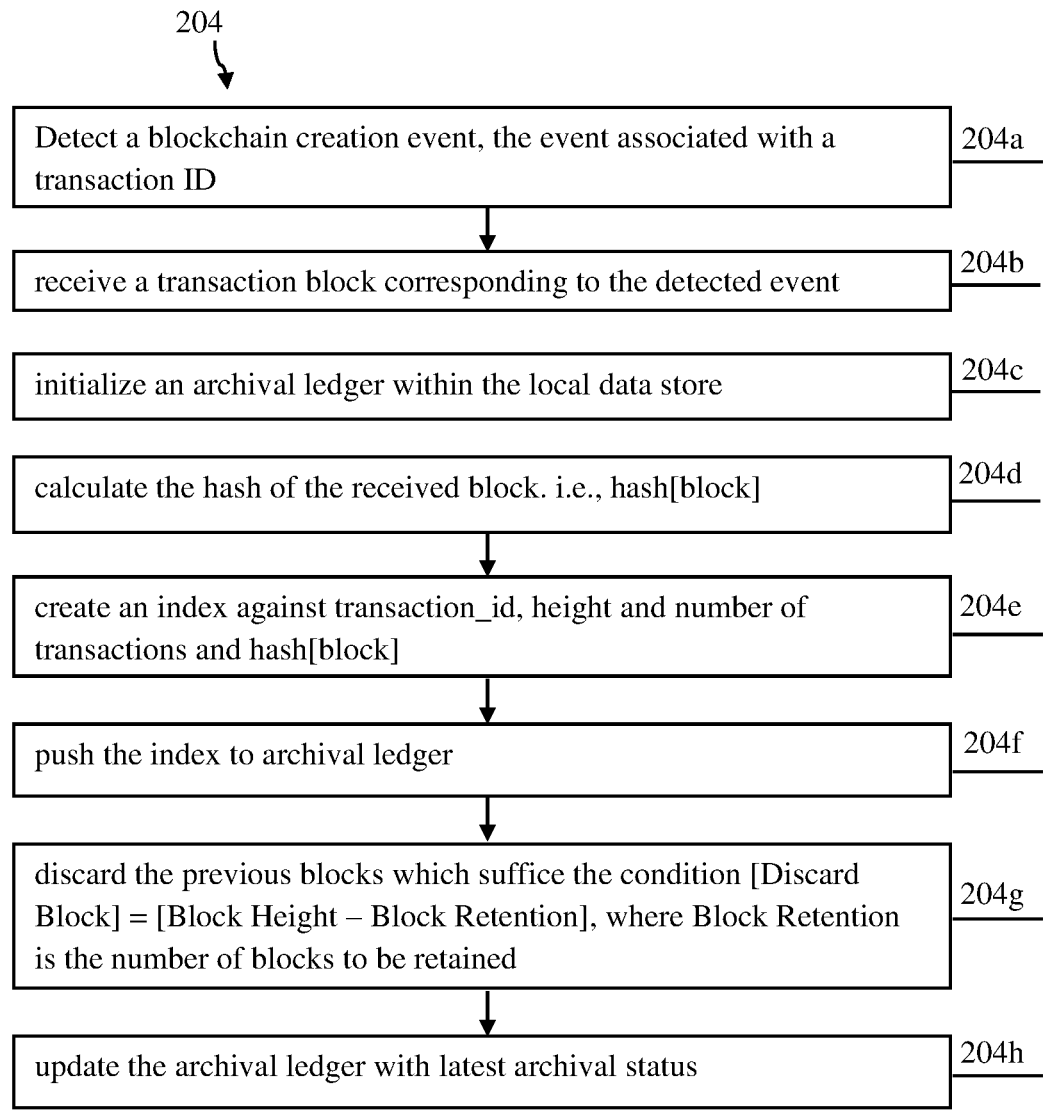

204

| Detect a blockchain creation event, the event associated with a transaction ID | 204a |

| receive a transaction block corresponding to the detected event | 204b |

| initialize an archival ledger within the local data store | 204c |

| calculate the hash of the received block. i.e., hash[block] | 204d |

| create an index against transaction_id, height and number of transactions and hash[block] | 204e |

| push the index to archival ledger | 204f |

| discard the previous blocks which suffice the condition [Discard Block] = [Block Height – Block Retention], where Block Retention is the number of blocks to be retained | 204g |

| update the archival ledger with latest archival status | 204h |

FIGURE 5B

SYSTEM FOR DATA ARCHIVAL IN A BLOCKCHAIN NETWORK AND A METHOD THEREOF

FIELD

The present disclosure generally relates to payment systems. More particularly, the present disclosure relates to a system and method for data archival in a blockchain network.

Definitions

As used in the present disclosure, the following terms are generally intended to have the meaning as set forth below, except to the extent that the context in which they are used indicate otherwise.

Consensus process: The expression "consensus process", in the context of distributed ledger technology, hereinafter refers to a process by which all the peers of a Blockchain network reach a common acceptance or consensus about the real-time state of the distributed ledger.

Archiver Node: The expression "Archiver node" refers to a node that inherits the same capabilities as a Full node and builds an archive of historical states.

Hash: The expression A "hash" refers to a function that meets the encrypting demand needed to solve blockchain computation.

Transaction Details: The expression "transaction details" refers to the details of a transaction such as price, asset, and ownership, that are recorded, verified, and settled across all nodes.

Participant Node(s): The expression "Participant Node (s)" refers to a plurality of nodes that are permitted for communication to perform payment transactions.

Archival Ledger: The expression "archival ledger" refers to a digital record containing a partial list of block creation events, a unique transaction identifier (ID), transaction data, and a hash of the transaction data associated with each of the events.

BACKGROUND

The background information herein below relates to the present disclosure but is not necessarily prior art.

Typically, in a blockchain network, the transaction data is stored in the form of blocks using a back linked list data structure, wherein each block points to the previous blocks. Each block in the blockchain network consists of transaction data, metadata, and header information, wherein the header information is a cryptographic hash of the transaction data in the block.

All the blocks also contain a reference to the previous blocks, thereby forming a chain. By utilising this hashing and chaining mechanism, blockchain systems ensure integrity and immutability of the data.

In the conventional approaches, each node in a blockchain network maintains and stores a copy of the entire ledger, i.e., all transaction records, in order to take part in the consensus process or to be a part of the network as a node. This means that the same amount of data gets replicated across all the nodes of the network. This requires the total storage capacity of the network to be in multiples of the number of nodes in the network.

Thus, due to the inherent design of the blockchain systems, a large amount of data needs to be replicated among all the participants in order to achieve data consistency, immutability and integrity. This not only raises the storage requirements, but also increases the operational expenses related thereto. This is one of the reasons which is leading to a lower adoption of blockchain systems in large scale and enterprise use cases.

Therefore, there is a need for a system and method for data archival in a blockchain network which alleviates the abovementioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a system for data archival in a blockchain network and a method thereof.

Another object of the present disclosure is to provide a system and method for data archival in a blockchain network that reduces the data storage requirements and associated costs.

Still another object of the present disclosure is to provide a system and method for data archival in a blockchain network that does not require each node in the network to maintain the data of all transactions (i.e., the entire ledger) in order to take part in the consensus process or to be a part of the network as a node.

Yet another object of the present disclosure is to provide a system and method for data archival in a blockchain network that makes a blockchain system more viable for large scale and enterprise use cases.

Other objects and advantages of the present disclosure will be more apparent from the following description when read in conjunction with the accompanying figures, which are not intended to limit the scope of the present disclosure.

SUMMARY

The present disclosure envisages a system for data archival in a blockchain network. The blockchain network comprises a plurality of participating nodes. Each of the participating nodes is categorized either as an archiver node or a non-archiver node. The system comprises a database and a data management module. The database is stored in each of the archiver nodes. The database comprises a list of block creation events, a transaction identifier (ID) and transaction data associated with each of the events, and a hash corresponding to the transaction data corresponding to each event. The data management module is executed in each non-archiver node of the network. The data management module comprises an archiving module and a data retrieving module. The archiving module is configured to maintain an archival ledger in a local data store of the non-archiver node. The archival ledger comprises a partial list of block creation events, a unique transaction identifier (ID), transaction data and a hash of the transaction data associated with each of the events. The data retrieving module is activated upon receiving, from another non-archiver node, a request for querying a transaction from a block. The request for querying the transaction comprises the unique transaction ID associated with the transaction to be queried. The data retrieving module is configured to check the archival ledger to determine whether the queried block is discarded or not, and is further configured to retrieve and return the transaction data associated with the queried block from one of the archival ledger and the database based on the determination.

In an embodiment, the archiving module comprises a hash generating module and an index generation module. The hash generating module is configured to detect a block creation event and receive a transaction block corresponding to the detected event. The block creation event is associated with a transaction having a unique transaction identifier (ID). The hash generating module is further configured to initialize an archival ledger within the local data store and calculate the hash of the transaction data in the received block upon detecting the block creation event. The index generation module is configured to generate an index against the transaction ID associated with the block, a height of the block, a number of transactions stored in the archival ledger, and the calculated hash of the transaction data. The data updating module is configured to push the generated index to the archival ledger and discard a pre-determined number of previous blocks (i.e., block creation events) maintained in the ledger. The data updating module is further configured to update the archival ledger with the latest archival status. In an embodiment, the number of blocks to be discarded is determined by computing a difference between the block height and a pre-defined number of blocks to be retained.

In an embodiment, the data retrieving module is configured to retrieve and return the transaction data associated with the queried block from:

the database if the queried block is found to be discarded from the archival ledger; or the archival ledger if the queried block is found in the archival ledger.

In an embodiment, the data retrieving module is configured to generate a gossip message request to retrieve the transaction data of the queried block from the archiver nodes if the block is found to be discarded. The gossip message comprises the transaction ID associated with the queried block, the block height, the hash associated with the block, and details of the requestor non-archiver node. In an embodiment, the system comprises a data fetching module. The data fetching module is executed in each archiver node and is configured to receive the gossip message from the requester non-archiver node, and is further configured to generate a gossip message response in response to the gossip message request. The gossip message response comprises the transaction data associated with the queried block appended to the gossip message request. The system additionally comprises a data validation module. The data validation module is executed in each non-archiver node of the network and is configured to receive the gossip message response from the data fetching module of the archiver node and store and display the received gossip message response upon obtaining a confirmation message from each of the archiver nodes.

The present disclosure further envisages a method for data archival in a blockchain network.

BRIEF DESCRIPTION OF THE ACCOMPANYING DRAWING

A system for data archival in a blockchain network and a method thereof of the present disclosure will now be described with the help of the accompanying drawing, in which:

FIGS. 5A and 5B illustrate a flow diagram of a method for data archival in a blockchain network, in accordance with the present disclosure.

LIST OF REFERENCE NUMERALS

10—Typical blockchain network
1-6—Participant nodes
$B_0$-$B_3$—Blocks
$D_0$—$D_3$—Transaction data
$T_0$—Genesis transaction
$T_1$-$T_{10}$—Transactions
$M_0$-$M_3$—Metadata
$H_0$-$H_3$—Hash of Data
$L_{(w)}$—Complete ledger
20—Blockchain network in accordance with present disclosure
$L_{(A)}/L_{(D)}/L_{(C)}$-Partial ledger
N-1 to N-3—Non-archiver Participant nodes
A-1 to A-3—Archiver nodes
30—Local data store
100—System
102—Database
104—Data management module
106—Archiving module
106*a*—Archival ledger
108*a*—Data retrieving module
108*b*—Data fetching module
110—Hash generating module
112—Index generation module
114—Data updating module
116—Data validation module

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "including," and "having," are open ended transitional phrases and therefore specify the presence of stated features, integers, steps, operations, elements and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

Figure 1:
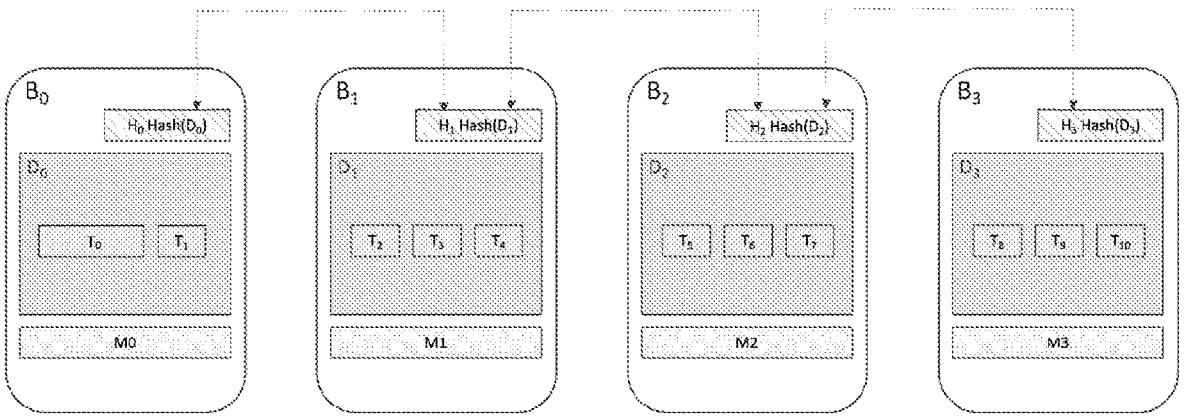
FIG. 1 illustrates a schematic representation of a ledger stored in the nodes of a blockchain network, in accordance with an embodiment of the prior art.

Typically, in a blockchain network, all the transactions are stored in the form of blocks using a back linked list data structure as shown in FIG. 1. Each block ($B_0$-$B_3$) of the network points to the previous blocks ($B_0$-$B_3$). Each block ($B_0$-$B_3$) consists of transaction data ($D_0$-$D_3$) comprising details of transactions ($T_0$-$T_{10}$), metadata ($M_0$-$M_3$), and header information ($H_0$-$H_3$), wherein the header information ($H_0$-$H_3$) is a cryptographic hash of the transaction data ($D_0$-$D_3$) in the respective block ($B_0$-$B_3$). All the blocks ($B_0$-$B_3$) also contain a reference to the previous blocks ($B_0$-$B_3$), thereby forming a chain. By utilising this hashing and chaining mechanism, blockchain systems ensure integrity and immutability of the data.

Figure 2:
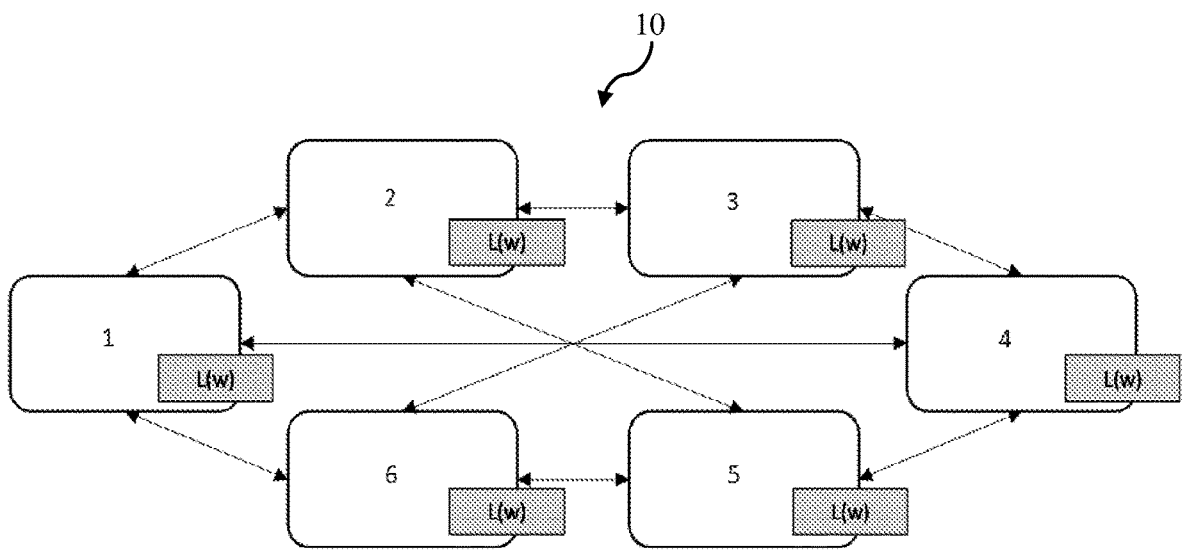
FIG. 2 illustrates a schematic diagram representing a traditional blockchain network, wherein each node stores information related to all the transactions, in accordance with another embodiment of the prior art.

Referring to FIG. 2, in the conventional approaches, each node (1-6) in a blockchain network 10 maintains and stores a copy of the entire ledger $L_{(w)}$, i.e., all transaction records, in order to take part in the consensus process or to be a part of the network 10 as a node (1-6). This means that the same amount of data gets replicated among all the nodes (1-6) of the network 10. This requires the total storage capacity of the network 10 to be in multiples of the number of nodes (1-6) in the network 10.

Thus, due to the inherent design of the blockchain systems, a large amount of data needs to be replicated among all the participant nodes (1-6) in order to achieve data consistency, immutability and integrity. This approach not only raises the storage requirements, but also increases the operational expenses related thereto. This is one of the reasons which is leading to a lower adoption of blockchain systems in large scale and enterprise use cases.

A calculation of the storage requirement in a traditional blockchain implementation 10 with two hundred participant nodes for one billion transactions in the ledger is provided below—
   a. [Transaction size]=3 Kilobit (Kb)
   b. [Number of participant nodes]=200 Nos.
   c. [Number of transactions in the ledger]=1 billion
   d. [Storage requirement per node]=(a*c)=3 Kilobit*1,000,000,000=3,000,000,000 Kilobit (Kb)~=375 Gigabyte (GB)
   e. [Total storage requirement]=(b*d)=375 Gigabyte*200=75,000 Gigabyte~=75 Terabyte (TB)

Now, assuming that every year 12 billion transactions are hitting the blockchain network 10, then the storage requirement would be as follows—
   a. [$1^{st}$ year storage requirement]=(e)=75 Terabyte (TB)
   b. [$2^{nd}$ year storage requirement]~=75 Terabyte (old)+75 Terabyte (new)=150 Terabyte (TB)
   c. [$10^{th}$ year storage requirement]~=(10*e)=10*75 Terabyte=750 Terabyte (TB)

The traditional networks do not support archival or deletion mechanisms natively, therefore, they require frequent addition of storage capacity to the nodes as long as they are running. This makes blockchain a less viable option for large scale and enterprise use cases.

To overcome the aforementioned problem, the present disclosure envisages a system (hereinafter referred to as "system 100") and method (hereinafter referred to as "method 200") for data archival in a blockchain network 20.

Figure 3:
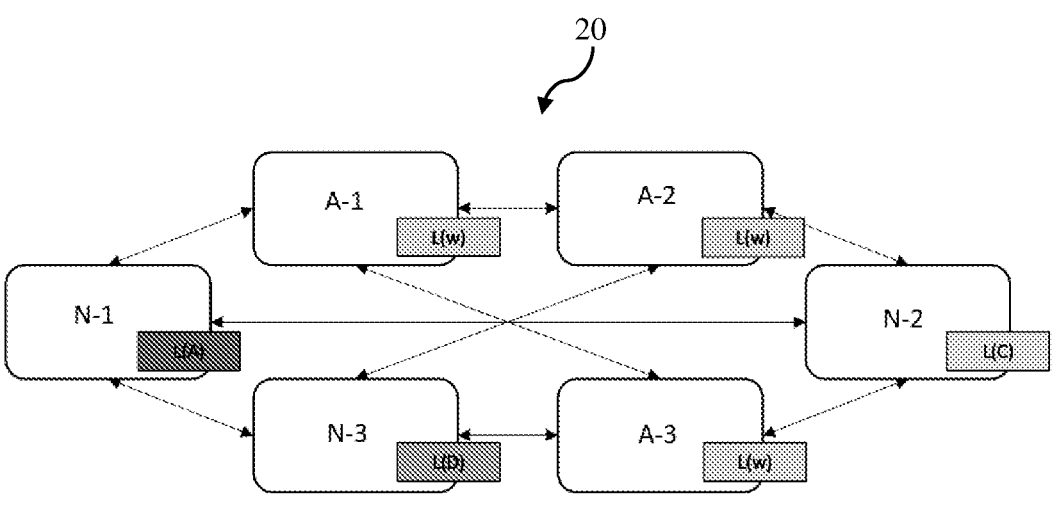
FIG. 3 illustrates a blockchain network with participant nodes and archiver nodes, in accordance with the present disclosure.

Referring to FIG. 3, the blockchain network 20, in accordance with the present disclosure, comprises a plurality of participating nodes. Each of the participating nodes is categorized either as an archiver node (A1-A3) or as a non-archiver node (N1-N3). The blockchain network 20 stores transactions across the nodes (A1-A3, N1-N3) in the form of blocks. A block consists of transaction data, metadata and header information, wherein the header information is a cryptographic hash of the data in the block. A block further contains a reference to the previous blocks and thus forms a chain. Each node (A1-A3, N1-N3) of the network 20 is configured to maintain its own ledger comprising a plurality of created blocks.

The system 100 for data archival is implemented in non-archival and archival nodes (N1-N3, A1-A3) to facilitate archival of the transaction data.

Figure 4:
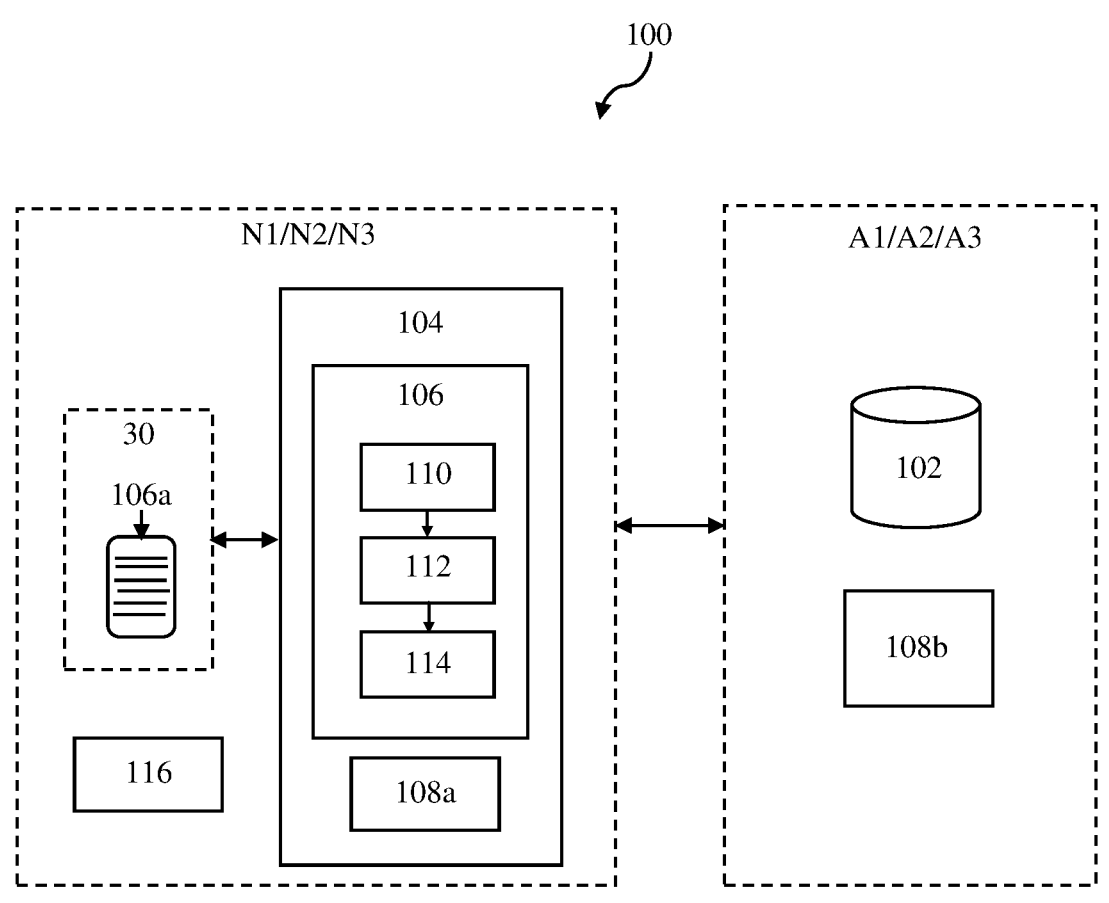
FIG. 4 illustrates a block diagram of a system for data archival in a blockchain network, in accordance with the present disclosure.

Referring to FIG. 4, the system 100 comprises a database 102 and a data management module 104. The database 102 is stored in each of the archiver nodes (A1-A3). The database 102 comprises a list of block creation events, a transaction identifier (ID) and transaction data associated with each of the events, and a hash corresponding to the transaction data corresponding to each event. The data management module 104 is executed in each non-archiver node (N1-N3) of the network 20. The data management module 104 comprises archiving module 106 and a data retrieving module 108a. The archiving module 106 is configured to maintain an archival ledger 106a in a local data store 30 of the non-archiver node (N1-N3). The archival ledger 106a is a partial ledger and comprises a partial list of block creation events, a unique transaction identifier (ID), transaction data and a hash of the transaction data associated with each of the events. Thus, the archiver nodes (A1-A3) maintain the complete ledger $L_{(w)}$, whereas the non-archiver participant nodes (N1-N3) maintain the partial ledger $106a/L_{(A/D/C)}$ only. The partial ledger $L_{(A/D/C)}$ i.e., the archival ledger 106a does not include transaction data associated with all the blockchain creation events. The data retrieving module 108a is activated upon receiving, from another non-archiver node (N1-N3), a request for querying a transaction from a block. The data retrieving module 108 is configured to check the archival ledger 106a to determine whether the queried block is discarded or not, and is further configured to retrieve and return the transaction data associated with the queried block from one of the archival ledger 106a and the database 102 based on the determination.

The archiver nodes (A1-A3) establish a communication channel to communicate with the non-archiver nodes (N1-N3) through gossip or gRPC protocols. The communication channel is responsible for delivering events and messages across different non-archiver nodes (N-1-N-3) and archiver nodes (A-1-A-3) within the network 20.

In an embodiment, the archiving module 106 comprises a hash generating module 110, an index generation module 112, and a data updating module 114. The hash generating module 110 is configured to detect a block creation event and receive a transaction block corresponding to the detected event. The block creation event is associated with a transaction having a unique transaction identifier (ID). The hash generating module 110 is further configured to initialize an archival ledger within the local data store 30 and calculate the hash of the transaction data in the received block upon detecting the block creation event. The index generation module 112 is configured to generate an index against the transaction ID associated with the block, a height of the block, a number of transactions stored in the archival ledger, and the calculated hash of the block. The data updating module 114 is configured to push the generated index to the archival ledger 106a and discard a pre-determined (configurable) number of previous blocks maintained in the ledger 106a. The data updating module 114 is further configured to update the archival ledger with the latest archival status. The archival status may indicate whether a record/index corresponding to a block is present in the ledger 106a or not. If the record is present in the ledger, the archival status will be 'present' or 'not archived'. If the data is discarded, then the archival status will be 'discarded' or 'successfully archived'. Thus, the records stored in the archival ledger 106a are a sub-set of the records stored in the database 102.

In an embodiment, the data retrieving module 108a is configured to retrieve and return the transaction data associated with the queried block from:

the database 102 if the queried block is found to be discarded from the archival ledger 106a; or
  the archival ledger 106a if the queried block is found in the archival ledger 106a.

In an embodiment, the request for querying the transaction comprises the unique transaction ID associated with the transaction to be queried. Upon receiving the querying request, the data retrieving module 108a first checks whether the transaction data corresponding to the transaction ID in the request is present in the archival ledger 106a. If the transaction data is present in the archival ledger 106a, the data retrieving module 108a extracts and returns the transaction data from the ledger 106a. Otherwise, the data retrieving module 108a communicates with the database 102 and extracts the transaction data corresponding to the transaction ID from the database 102.

In an embodiment, the data updating module 114 determines the number of blocks to be discarded by computing a difference between the block height and a pre-defined number of blocks to be retained The blocks to be discarded may be computed as—

$$[\text{Discard Block}]=[\text{Block Height}-\text{Block Retention}],$$

where 'Block Retention' refers to the number of blocks to be retained.

In an embodiment, the data retrieving module 108a is configured to generate a gossip message request to retrieve the transaction data of the queried block from the archiver nodes (A1-A3) if the block is found to be discarded. The gossip message comprises the transaction ID associated with the queried block, the block height, the hash associated with the block, and details of the requestor non-archiver node (N1-N3).

In an embodiment, the system 100 comprises a data fetching module 108b and a data validation module 116. The data fetching module 108b is executed in each archiver node (A1-A3), and is configured to receive the gossip message from the requester non-archiver node (N1-N3). The data fetching module 108b is further configured to generate a gossip message response in response to the gossip message request. The gossip message response comprises the transaction data associated with the queried block appended to the gossip message request. The data validation module 116, is executed in each non-archiver node (N1-N3), and is configured to receive the gossip message response from the data fetching module 108b of the archiver node (A1-A3) and store and display the received gossip message response upon obtaining a confirmation message from each of the archiver nodes (A1-A3).

FIGS. 5A and 5B show a flow diagram of the method 200 for data archival in a blockchain network 20, the blockchain network 20 comprising a plurality of participating nodes. Each of the participating nodes is categorized either as an archiver node (A1-A3) or a non-archiver node (N1-N3). Referring to FIG. 5, the method 200 comprises the following steps:

At step 202, a database 102 associated with each of the archiver nodes (A1-A3) stores a list of block creation events, a transaction identifier (ID) and transaction data associated with each of the events, and a hash corresponding to the transaction data corresponding to each event.

At step 204, an archiving module 106 executed in each non-archiver node (N1-N3) of the network 20 maintains an archival ledger 106a in a local data store 30 of the non-archiver node (N1-N3). The archival ledger 106a comprises a list of block creation events, a unique transaction identifier (ID), and a hash of the transaction data associated with each of the events.

At step 206, a data retrieving module 108a executed in each non-archiver node (N1-N3) of the network 20 receives a request for querying a transaction from a block, from another non-archiver node (N1-N3).

At step 208, the data retrieving module 108 checks the archival ledger 106a to determine whether the queried block is discarded or not.

At step 210, the data retrieving module 108 retrieves and returns the transaction data associated with the block from one of the archival ledger 106a and the database 102 based on the determination.

In an embodiment, the step 204 of maintaining, the archival ledger 106a in the local data store 30 of the non-archiver node (N1-N3) comprises the following sub-steps—

At step 204a, a hash generating module 110 detects a block creation event, wherein the block creation event is associated with a transaction having a unique transaction identifier (ID).

At step 204b, the hash generating module 110 receives a transaction block corresponding to the detected event.

At step 204c, the hash generating module 110 initializes an archival ledger within the local data store 30.

At step 204d, the hash generating module 110 calculates the hash of the received block upon detecting the block creation event.

At step 204e, an index generation module 112 generates an index against the transaction ID associated with the block, a height of the block, a number of transactions stored in the archival ledger 106a, and the calculated hash of the block.

At step 204f, a data updating module 114 pushes the generated index to the archival ledger 106a.

At step 204g, the data updating module 114 discards a pre-determined number of previous blocks maintained in the ledger.

At step 204h, the data updating module 114 updates the archival ledger with the latest archival status.

For every block-creation event, each participant non-archiver (N1-N3) of the network 20 is configured to perform the following operations:

initialize a new archival ledger within a local data store (Happens only once, during the start of the node. After that it keeps on adding information to the same data store.); calculate the hash of the transaction data in the block. i.e., hash [block txn data];
  create an index against transaction_id, height and number of transactions and hash [block];

push the index to archival ledger;

discard the previous blocks which suffice the condition [Discard Block]=[Block Height-Block Retention], where Block Retention is the number of blocks to be retained; and update the archival ledger with latest archival status.

Similarly, during each block creation event, each participant archiver node (A1-A3) is configured to update the database 102 with the transaction data and the index corresponding to the block creation event.

In an embodiment, the step 210 of retrieving and returning the transaction data comprises retrieving and returning the transaction data associated with the queried block from:

the database 102 if the queried block is found to be discarded from the archival ledger 106a; or the archival ledger 106a if the queried block is found in the archival ledger 106a.

In an embodiment, each of the archiver nodes (A1-A3) also comprises the Data fetching module 108b. The data retrieving module 108a receives the gossip message from a requester node (which can be any non-archiver node (N1-N3)) and can be configured to generate a gossip message response in response to the gossip message request. The gossip message response comprises the transaction ID, block height, hash, requester node details, and the requested block/transaction data. The response can be accessed by the requester node. The requester node further comprises the data validation module 110 configured to obtain a confirmation message (Gossip response which contains the requested block) from all the participant nodes of the network 20 before moving the requested block/transaction data to cache or providing the same to an interface.

An exemplary pseudo code depicting the function of the archival module is as follows— the nodes of the network. It can be understood that the node may be any kind of computing device, such as a computer, a laptop, or a server. The processor may be a general-purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth.

A blockchain network 20 can have one or more archiver nodes (A-1-A-3) based on the requirement of trust and any number of non-archiver nodes (N-1-N-3). In permissioned blockchain systems, an optimal number of archiver nodes (A1-A3) would be 3 or 5 trusted parties and in public blockchains, there can be 'X' number of geographically separated archiver nodes (A1-A3), where 'X' is directly proportional to the trust requirements.

The ledger size in each node can be different based on the Block Retention parameter. Whenever there is a need of transaction query, retrieval, or traversal, the participant node would check the archival ledger 106a to determine whether the block is discarded or not. If it is not discarded, then it can be queried from the ledger otherwise, the node will generate a gossip message request to retrieve the data from the archiver nodes (A1-A3). An exemplary gossip message request is shown below—

GossipMessage_Request(transaction_id, block_height, hash, requester_node)

```
Initialize archival ledger;
Do
    {
    Read (transaction block corresponding to a block creation event, wherein the event is
    associated with a transaction having a unique transaction ID);
    Calculate 'A'; // where A = HASH(transaction data)
    Generate 'B'; // where B = Index(transaction ID associated with the block, a height of
    the block, a number of transactions stored in the archival ledger, and A)
    Push 'B' to the archival ledger;
    Discard 'C' blocks; // where 'C' = (Block Height – Block Retention)
    Update the status of blocks;
    }
While (detecting the block creation event)
```

Similarly, an exemplary pseudo code depicting the function of the data retrieving module is as follows—

This message is received by the archiver nodes (A1-A3). The archiver nodes (A1-A3) retrieve the transaction infor-

```
Read (Query request for transaction with ID 'x');
If (transaction data corresponding to ID 'x' present in archival ledger == YES)
    {
    Return (the transaction data from the archival ledger);
    }
Else
    {
    GenerateGossipMessage(transactionId, BlockHeight, hash, requesterNode)
    ProcessGossipResponse(transactionId, BlockHeight, hash, data)
    Return (the transaction data from the database);
    }
```

Advantageously, data management module 104, the archiving module 106, the data retrieving module 108a, the data fetching module 108b, and the data validation module 116 may be implemented using one or more processor(s) of mation from the database 102 and create a response as a gossip message response. An exemplary gossip message response is shown below-GossipMessage_Response(transaction_id, block_height, hash, requester_node, data)

The gossip response can be accessed by the requester node 'R'. The requestor node 'R' may wait for 'X' number of confirmations before moving the transaction information to the cache or providing it to the interfaces. Here, X number of confirmations are required to ensure the integrity of the data.

The reduction in the overall storage requirement after adopting the system 100 and the method 200 of the present disclosure is discussed below—

The requirement of storage capacity for a blockchain network comprising two hundred participant non-archiver nodes and five archiver nodes for one billion transactions is calculated as follows— a. [Transaction size]=3 Kilobit (Kb)
   b. [Number of participant/non-archiver nodes]=200 Nos.
   c. [Number of Archiver nodes]=5
   d. [Number of transactions in the ledger]=1 Billion
   e. [Actual Storage requirement per node]=(a*d)=3 Kilo-bit*1,000,000,000=3,000,000,000 Kilobit (Kb)~=375 Gigabyte (GB)

Assuming that the five archiver nodes are maintaining full ledger and all participant nodes are only maintaining last 50,000 transactions in the ledger.

f. [Retention parameter]=50000, i.e., Number of transactions to be retained in the ledger.
   g. [Total Storage Requirement for archiver Nodes]=(c*e)=5*375 Gigabytes (GB)=1875 Gigabyte (GB)~=1.875 Terabyte (TB)
   h. [Storage Requirement for non-archiver nodes)=(a*f)=3 Kilobit*50000~=18.75 Megabyte (MB)
   i. [Total Storage Requirement for non-archiver nodes]=(b*h)=200*18.75 Megabyte=3,750 Megabyte (MB)~=3.75 Gigabyte (GB)
   j. [Total storage requirement for the entire system]=(g+h)=1875 Gigabyte+3.75 Gigabyte=1878.75 Gigabytes (GB)~=1.878 Terabytes (TB)

Thus, there is a reduction in the storage requirement from 75 Terabytes (TB) to 1.87 Terabytes (TB).

The system 100 and method 200 lead to about 97.5% reduction in the total storage requirements of the blockchain network for the given set of assumptions and would be even higher for larger networks having higher number of nodes processing higher volumes. As part of optimising the storage requirements, archival mechanisms are implemented within the nodes and message communication between nodes is facilitated over a gossip protocol. Even though the data is removed from the nodes and ledger, it is ensured that the system 100 guarantees the integrity of the data. This approach drastically reduces the overall storage requirement of the blockchain network without compromising any fundamentals of blockchain technology. The system 100 and method 200 can be implemented in both public and private blockchain systems.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

The foregoing description of the embodiments has been provided for purposes of illustration and is not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a system and method for data archival in a blockchain network that:

leads to about 97.5% reduction in the total data storage requirements;
   is easy to implement and maintain;
   does not require each node in the network to maintain the data of all transactions (i.e., the entire ledger) in order to take part in the consensus process or to be a part of the network as a node;
   makes blockchain more viable for large scale and enterprise use cases; and
   leads to savings in the storage cost.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation

The invention claimed is:

1. A system (100) including a processor for data archival in a blockchain network (20), the blockchain network (20) comprising a plurality of participating nodes, each of the participating nodes categorized either as an archiver node (A1-A3) or a non-archiver node (N1-N3), the system (100) comprising:

i. a database (102) stored in each of the archiver nodes (A1-A3), the database (102) comprising a list of block creation events, a transaction identifier (ID) and transaction data associated with each of the block creation events, and a hash corresponding to the transaction data corresponding to each block creation event; and ii. a data management module (104) executed in each non-archiver node (N1-N3) of the blockchain network (20), the data management module (104) comprising:

an archiving module (106) configured to maintain an archival ledger (106a) in a local data store (30) of the non-archiver node (N1-N3), the archival ledger (106a) comprising a partial list of the block creation events, the transaction ID, the transaction data and a hash of the transaction data associated with each of the block creation events; and a data retrieving module (108a) activated upon receiving, from another non-archiver node (N1-N3), a request for querying a transaction from a block, the data retrieving module (108a) configured to check the archival ledger (106a) to determine whether the block is discarded or not, and further configured to retrieve and return the transaction data associated with the block from one of the archival ledger (106a) and the database (102) based on the determination, wherein the data retrieving module (108a) is configured to retrieve and return the transaction data associated with the block from:

the database (102) when the block is found to be discarded from the archival ledger (106a); or the archival ledger (106a) when the block is found in the archival ledger (106a).

2. The system (100) as claimed in claim 1, wherein the request for querying the transaction comprises the transaction ID associated with the transaction to be queried.

3. The system (100) as claimed in claim 1, wherein the archiving module (106) comprises:

i. a hash generating module (110) configured to detect a block creation event and receive a transaction block corresponding to the detected block creation event, the block creation event associated with a transaction having a unique transaction identifier (ID), the hash generating module (110) further configured to initialize the archival ledger within the local data store (30) and calculate the hash of the transaction data in the received transaction block upon detecting the block creation event;

ii. an index generation module (112) configured to generate an index against the transaction ID associated with the transaction block, a height of the transaction block, a number of transactions stored in the archival ledger, and the calculated hash of the transaction block; and iii. a data updating module (114) configured to push the generated index to the archival ledger (106a) and discard a pre-determined number of previous transaction blocks maintained in the archival ledger (106a), and further configured to update the archival ledger with a latest archival status.

4. The system (100) as claimed in claim 3, wherein the data updating module (114) determines a number of transaction blocks to be discarded by computing a difference between the height of the transaction block and a pre-defined number of transaction blocks to be retained.

5. The system (100) as claimed in claim 1, wherein the data retrieving module (108a) is configured to generate a gossip message request to retrieve the transaction data of the block from the archiver nodes (A1-A3) when the block is found to be discarded.

6. The system (100) as claimed in claim 5, wherein the gossip message comprises the transaction ID associated with the block, the height of the transaction block, the calculated hash associated with the transaction block, and details of a requestor non-archiver node (N1-N3).

7. The system (100) as claimed in claim 6, which comprises a data fetching module (108b), executed in each archiver node (A1-A3), configured to receive the gossip message from the requester non-archiver node (N1-N3), and further configured to generate a gossip message response in response to the gossip message request, the gossip message response comprising the transaction data associated with the block appended to the gossip message request.

8. The system (100) as claimed in claim 7, which comprises a data validation module (116), executed in each non-archiver node (N1-N3), configured to receive the gossip message response from the data fetching module (108b) of the archiver node (A1-A3) and store and display the received gossip message response upon obtaining a confirmation message from each of the archiver nodes (A1-A3).

9. A method (200) for data archival in a blockchain network (20), the blockchain network (20) comprising a plurality of participating nodes, each of the participating nodes categorized either as an archiver node (A1-A3) or a non-archiver node (N1-N3), the method (200) comprising:

i. storing (202), in a database (102) associated with each of the archiver nodes (A1-A3), a list of block creation events, a transaction identifier (ID) and transaction data associated with each of the block creation events, and a hash corresponding to the transaction data corresponding to each block creation event;

ii. maintaining (204), by an archiving module (106) executed in each non-archiver node (N1-N3) of the blockchain network (20), an archival ledger (106a) in a local data store (30) of the non-archiver node (N1-N3), the archival ledger (106a) comprising a list of block creation events, a unique transaction identifier (ID), and a hash of the transaction data associated with each of the block creation events;

iii. receiving (206), by a data retrieving module (108a) executed in each non-archiver node (N1-N3) of the blockchain network (20), a request for querying a transaction from a block, from another non-archiver node (N1-N3);

iv. checking (208), by the data retrieving module (108a), the archival ledger (106a) to determine whether the block is discarded or not; and v. retrieving and returning (210), by the data retrieving module (108a), the transaction data associated with the block from one of the archival ledger (106a) and the database (102) based on the determination, wherein the data retrieving module (108a) is configured to retrieve and return the transaction data associated with the block from:

the database (102) when the block is found to be discarded from the archival ledger (106a); or the archival ledger (106*a*) when the block is found in the archival ledger (106*a*).

10. The method (200) as claimed in claim 9, wherein the step (204) of maintaining, the archival ledger (106*a*) in the local data store (30) of the non-archiver node (N1-N3) comprises:

i. detecting (204*a*), by a hash generating module (110), a block creation event, the block creation event associated with a transaction having the unique transaction ID;

ii. receiving (204*b*), by the hash generating module (110), a transaction block corresponding to the detected block creation event;

iii. initializing (204*c*), by the hash generating module (110), the archival ledger within the local data store (30) and calculating (204*d*) the hash of the received transaction block upon detecting the block creation event;

iv. generating (204*e*), by an index generation module (112), an index against the transaction ID associated with the transaction block, a height of the transaction block, a number of transactions stored in the archival ledger (106*a*), and the calculated hash of the transaction block;

v. pushing (204*f*), by a data updating module (114), the generated index to the archival ledger (106*a*);

vi. discarding (204*g*), by the data updating module (114), a pre-determined number of previous blocks maintained in the archival ledger; and vii. updating (204*h*), by the data updating module (114), the archival ledger with a latest archival status.

\*    \*    \*    \*    \*